United States Patent Office.

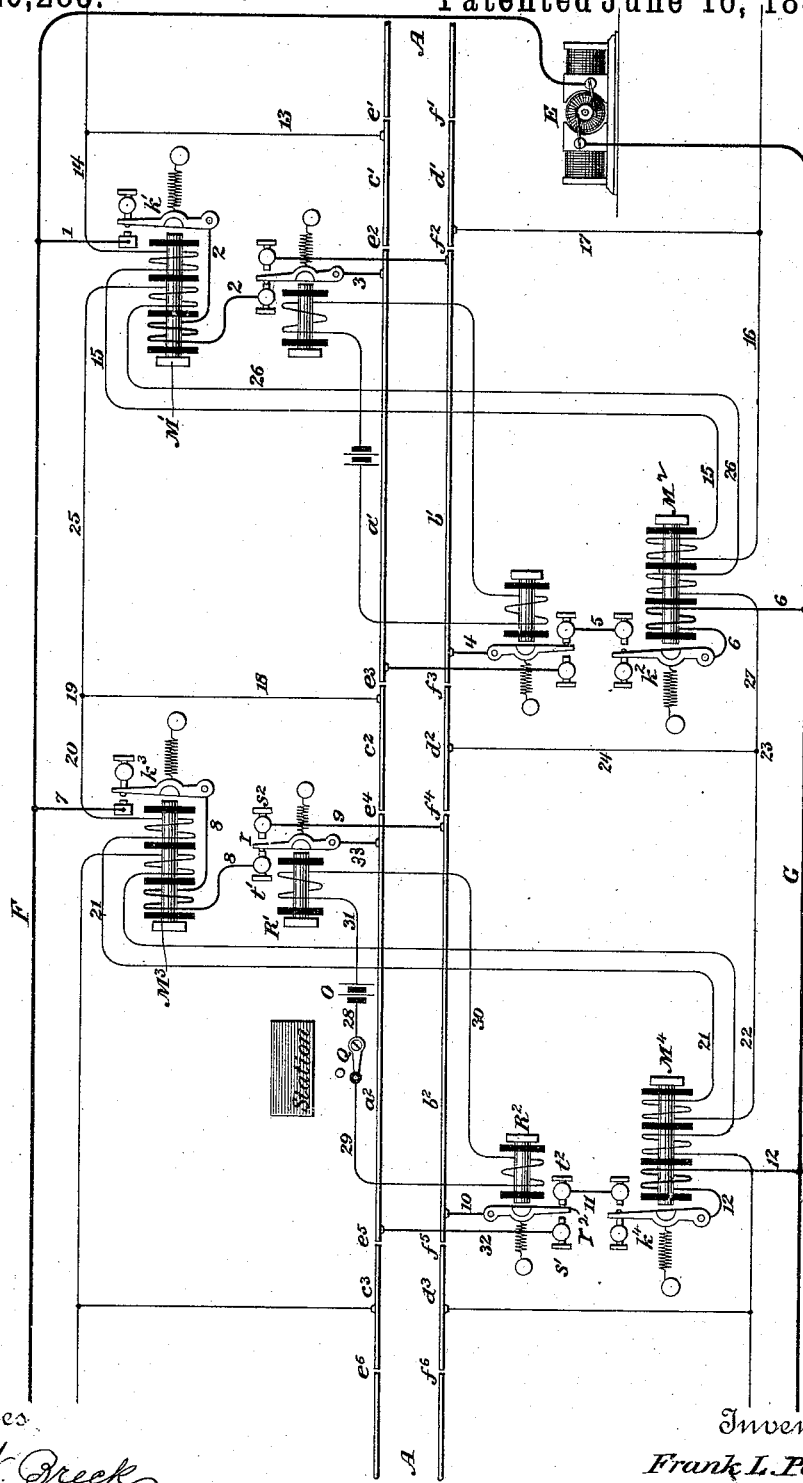

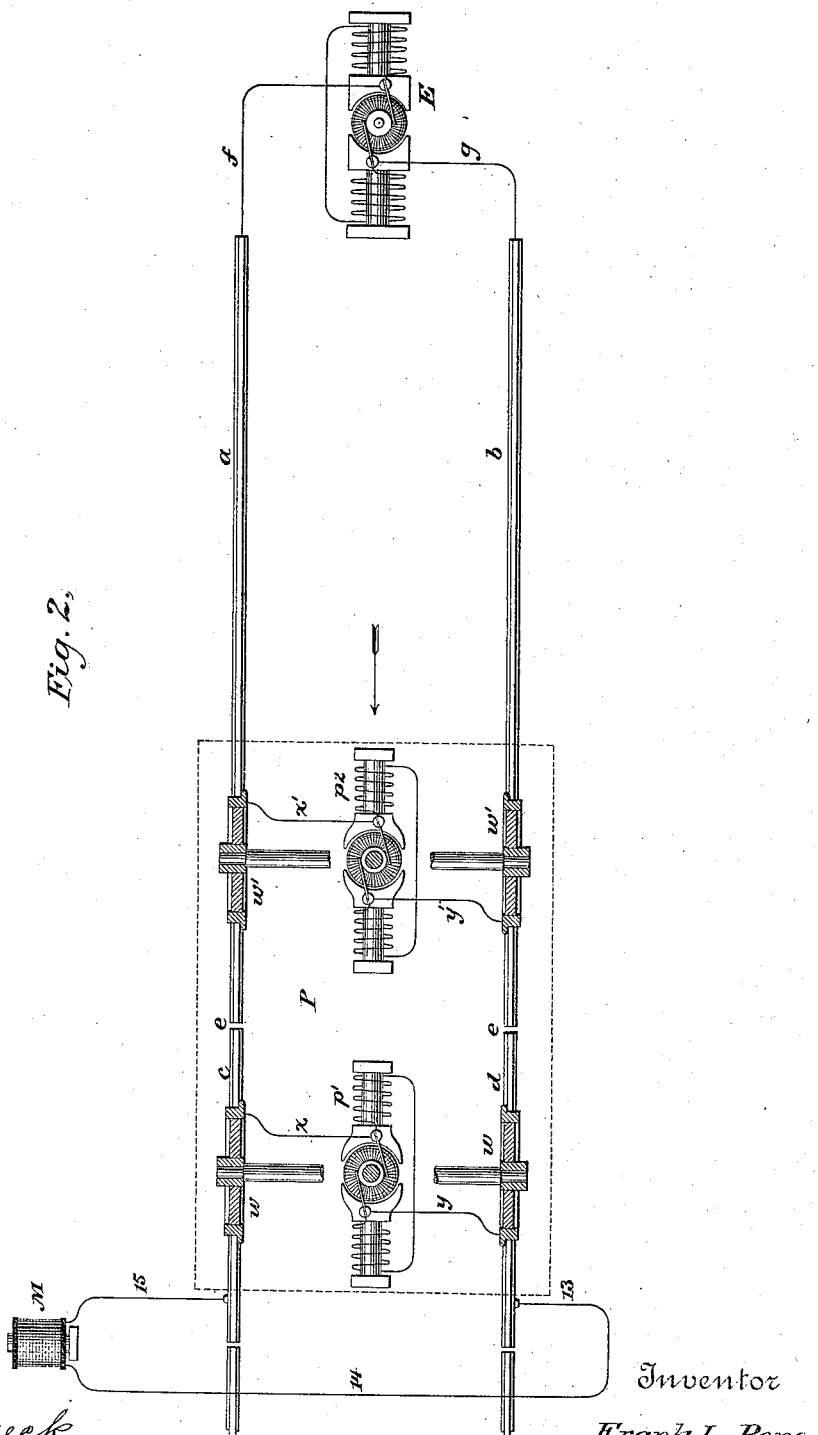

FRANK L. POPE, OF ELIZABETH, NEW JERSEY.

ELECTRICALLY-ACTUATED RAILWAY SYSTEM.

SPECIFICATION forming part of Letters Patent No. 320,283, dated June 16, 1885.

Application filed February 24, 1885. (No model.)

*To all whom it may concern:*

Be it known that I, FRANK L. POPE, a citizen of the United States, residing in Elizabeth, in the county of Union and State of New Jersey, have invented certain new and useful Improvements in Electrically-Actuated Railway Systems, of which the following is a specification.

My invention relates to apparatus and means for propelling vehicles upon railroads by electricity; and it consists in an improved organization of automatically-actuated circuits and circuit-controllers for conveying and directing the electric current from stationary sources of electric energy situated at convenient points along the line of the railroad to a vehicle moving thereupon. The invention further comprises means and appliances for stopping said vehicles while in motion, which may be actuated instantly from any point along or upon the line of the railroad, or upon the particular section of the railroad which is being traversed by said vehicle or vehicles.

In electrically-actuated railroad systems heretofore in use two principal methods have been employed for conveying the electric current from a stationary source of electric energy to a traveling motor, which propels and is at the same time carried by a moving vehicle. In one system the track of the railway is divided into electrical working-sections of convenient length, the opposite lines of rails of each section being insulated from each other as completely as possible, and each line of rails of each section being in like manner carefully insulated from the abutting rails of the next adjacent section in both directions. Each section of track thus prepared has its opposite lines of rails permanently connected with the respective opposite poles of a suitable source of electricity, such as a dynamo-electric generator driven by a steam-engine or other suitable prime motor. The opposite wheels of each pair of wheels supporting the vehicle are insulated from each other. An electric motor is mounted upon and carried by the vehicle, its rotating portion being mechanically connected with an axle and its wheels, while its electric terminals are respectively connected to the tires of the opposite wheels upon the axle. Thus when the vehicle stands upon the insulated track, an electrical connection is formed from one line of rails to the other, and the current traverses the coils of the electric motor, thus causing the same to turn the wheels which propel the vehicle along the track of the railway.

In the other systems referred to, one or more specially insulated electric conductors are extended for a considerable distance, in some cases several miles, along the line of the railway and parallel thereto. In this case the rails of the track form no part of the direct or supply circuit. They may or may not form a portion of the return-circuit. The connection between the traveling motor and the supply and return conductor or conductors is made by means of suitable contact devices—such as brushes, rollers, or scrapers. In this system the main conductor is sometimes divided into sections, which are successively brought into electrical connection with the source of electrical energy as the vehicle advances along the track.

My invention is equally applicable in connection with either of these two systems; but I have preferred to describe and explain it as applied to the first-mentioned organization, in which the rails of the track are insulated, and of themselves form the sectional conductor which supplies the electric current to the traveling motors.

The general object of my invention is to enable vehicles to be propelled by electricity upon a railway at a high rate of speed and in either direction, and to automatically supply themselves with an electric current, and, also, to enable said vehicles to be effectually controlled from designated stations, and, in case of emergency, from any point whatever along the line of the railway.

In my present invention the automatic circuit-controllers are operated by electro-magnets, and the helices of these electro-magnets are included in one or more independent local controlling-circuits which derive their actuating-current from a generator carried upon the moving vehicle itself, which current is automatically brought into action just before said vehicle enters upon any given section going in either direction.

The invention also comprises an independent circuit, which is extended along each section of the electrically-operated railway, being preferably conducted through a small wire placed within convenient distance of the ground at the side of the track, which may be termed a "break-down" wire; and means are provided whereby upon the severing of this wire the flow of the electric current from the main conductors to a moving vehicle upon the section is not only instantly interrupted, but the electric motor which propels the vehicle is short-circuited, thus instantly causing a powerful resistance to be opposed to the progress of the vehicle, so as to bring it promptly to a stand.

The invention further comprises certain details in the construction and organization of the apparatus for automatically controlling the electric currents passing from the main conductors through the branch circuits to the insulated track-sections, irrespective of the direction in which the vehicle may be moving.

In the accompanying drawings, Figure 1 is a diagram illustrating the general features of my invention, and Fig. 2 is a diagram which shows the organization of electric circuits in or upon a traveling vehicle or locomotive especially adapted to be used in and to form a part of my improved system.

In Fig. 1, A A represent a railway-track which is divided into insulated working-sections of convenient length, two of which are shown at $a'$ $b'$ and $a^2$ $b^2$. The rail-joints which form the terminations of these sections are rendered mechanically continuous, but electrically discontinuous by the interposition of insulating material. Such insulating-joints may be constructed in any suitable or well-known manner—such, for example, as that described in my former Letters Patent No. 129,425, of July 16, 1872, to which reference is had. These insulating-joints are inserted in the track at proper intervals and separate the adjacent sections from each other, as shown at $e'f'$, $e^2f^2$, $e^3f^3$, $e^4f^4$, $e^5f^5$, and $e^6f^6$. This method of dividing a railroad-track into insulated sections is well known in connection with the art of automatic railway-signaling, and in itself forms no part of the present invention. It may be remarked, however, that it is desirable in practice to apply a special conducting connection between the abutting ends of the adjacent rails which constitute the insulated section. Such a connection is shown and described, for example, in the patent of Gassett and Fisher, No. 227,102 of May 4, 1880. The length of the insulated sections of track need not be uniform, but may with advantage vary according to circumstances from, say, five hundred to two thousand feet in length. The more perfect the insulation of the track the longer the section may be made.

Between each two of the insulated working-sections last described are placed short sections of the same character alternating therewith, as shown at $c'$ $d'$, $c^2$ $d^2$, $c^3$ $d^3$. The length of these short sections is preferably made to correspond with the length of the wheel-bases of the vehicles designed to be used on the railway for reasons hereinafter to be explained. As a rule, they may be made from ten to thirty feet in length.

Two insulated electrical main conductors, F and G, are extended along the line of the railroad A A and parallel, and in convenient proximity thereto. These conductors are preferably formed of thick copper wires or rods, and they may be either suspended in the air and attached to posts by suitable insulating-supports, in the manner of an ordinary telegraph-line, or they may be placed in tubes above or beneath the surface of the ground, or arranged in any other convenient manner.

At one or more convenient points along the line of the main conductors and of the railroad suitable sources of electricity are established, preferably consisting of dynamo-electric machines arranged either singly or in groups and driven by steam-engines or other convenient prime motors, and the positive and negative terminals of each generator or group of generators E are respectively united to the main conductors F and G, as shown in the figures. The opposite insulated lines of rail of each working track-section are respectively connected with the insulated conductors F and G through the circuit-controlling devices at each end of the section. For example, the rail-section $a'$ may be connected with the main conductor F by the branch-conductor 1 2 3, and the opposite rail-section, $b'$, with the conductor G by the branch 4 5 6. In like manner the branch 7 8 9 connects the rail-section $a^2$ with the conductor F, and the branch 10 11 12 with the rail-section $b^2$ through the conductor G, and so on. It is to be understood that each working rail-section $a'$ and $b'$, $a^2$ and $b^2$, &c., is provided with a branch conductor and circuit-controller at one of its ends, the connection being preferably made in the manner shown—that is, to the right-hand end of rail-section $a'$, and to the left-hand end of the section $b'$. Each of the branches 1 2 3, 4 5 6, 7 8 9, 10 11 12, &c., is normally open, being provided with a key or circuit-controller as seen at $k'$ $k^2$ $k^3$ $k^4$. These, when closed, establish an electric connection between the conductors F and G and the respective insulated lines of rails.

The alternate short insulated sections $c'$ $d'$, $c^2$ $d^2$, $c^3$ $d^3$ may be designated as "controlling sections," as distinguished from the working-sections hereinbefore described. These sections furnish a means whereby the electric locomotive or vehicle just before entering upon any one of the working-sections is enabled, automatically, to place such working-section in connection with the main conductor. This is effected by means of a local circuit which unites the opposite insulated rails of each controlling-section—as, for example, $c^2$ and $d^2$—which circuit traverses a helix upon each one of four electro-magnets, M' M² M³ M⁴, the office of said electro-magnets being to complete the circuit of the respective branch conductors hereinbefore described, leading from the main conductor to the insulated rails of the working-sections. The manner in which this result is effected will be best understood by reference to the detached diagram, Fig. 2, in which $a$ and $b$ represent the rails of the working-section, which are connected by means of the conductors $f$ and $g$ with the terminals of a suitable dynamo-electric machine or other source of electric energy, E.

P represents an electrically-actuated locomotive or vehicle adapted to travel upon said rails. This vehicle is provided with two pairs of wheels, $w\ w$ and $w'\ w'$. The outer rim or tire of each wheel is insulated, which is preferably effected by interposing an insulating substance at some point between the tire and the hub.

$p'$ and $p^2$ are reversible dynamo-electric machines—that is to say, they are machines capable of acting either as generators or motors. The movable or rotating portion of each of these generators is mechanically connected with or attached to the axle of its corresponding pair of wheels, and the terminals of the coils of the machine are respectively connected to the tires of the opposite wheels of the pair, as shown at $x$ and $y$ and $x'$ and $y'$. Thus it will be understood that each pair of wheels of the vehicle P, with its actuating motor, forms an independent electric connection from one insulated rail to the other, so that when the vehicle is standing or traveling upon a working-section, as $a\ b$, the two motors $p'$ and $p^2$ will be connected in multiple arc with each other and with the generator E. The short or controlling section $c'$ or $d'$, as hereinbefore explained, is not in electrical connection with the generator E, but is connected with a local circuit, 13 14 15, which includes the coils of an electro-magnet, M; hence it will be understood that when the vehicle is passing over the working-section $a\ b$, both the dynamo-electric machines $p'\ p^2$ will act as electric motors, and will exert their force in propelling the vehicle P; but so soon as the latter reaches the position shown in Fig. 2, in which the front or advance pair of wheels rest upon the controlling insulated section $c\ d$, the dynamo-electric machine $p'$ no longer acts as a motor, but instantly becomes a generator, acting in that capacity to transmit an electric current through the rails $c\ d$ and the electric circuit 13 14 15, and thus actuating an electro-magnet or other translating device, M. Meanwhile, the other dynamo-electric machine, $p^2$, continues to act as a motor until, by reason of the progressive movement of the vehicle, it reaches the insulated joints $e\ e$, when it in turn becomes a generator; but at this instant, provided the controlling-section is of proper length, the other machine, $p'$, passes on to the next working-section in advance and again commences to act as a motor; hence as the vehicle P passes along the track both machines are acting as motors for the greater part of the time, and even while one machine is momentarily acting as a generator its companion continues to act as a motor, so that the propelling power of the main current upon the vehicle is never wholly suspended.

It is obvious that a vehicle provided with one electric motor acting upon a single pair of wheels may be used in connection with the system of insulated sectional conductors and connecting circuits which have been described, the only objection being that the motor will momentarily cease to act as such while passing over the short controlling-sections. This in most cases will be a matter of little importance, as the momentum of the vehicle will be sufficient to impel it forward to the next working-section. For uniform and continuous action the organization hereinbefore described, comprising two or more independent motors upon one vehicle, is to be preferred in practice.

The operation of the apparatus is as follows: Suppose a vehicle, traveling in the direction indicated by the arrow, enters upon the short controlling-section $c'\ d'$ at the right of the figure. The motor upon the vehicle, acting for the moment as a generator, will transmit a current through a local controlling circuit, which may be traced as follows: From the insulated rail $c'$ by wires 13 and 14, traversing the helix of the controlling-magnet M', thence by wire 15 to the helix of controlling-magnet $M^2$, thence by wires 16 and 17 to the insulated rail $d'$, and thence to the other pole of the generator. The electro-magnets M' $M^2$ will now be simultaneously excited, and will attract their armatures, causing the circuit-controllers $k'\ k^2$ to simultaneous complete the circuit between the main conductor F and the insulated rail-section $a'$ and between the main conductor G and the insulated section $b'$. The main actuating-current, which is thus caused to traverse the wires 2 and 6 passes through an independent helix upon the magnets M' and $M^2$, and thus retains the circuit-controllers $k'\ k^2$ in position after the cessation of the local current which originally caused the electro-magnets M' and $M^2$ to become excited. The traveling vehicle is thus supplied with an actuating-current from the main conductors so long as it remains upon the section $a'$ $b'$. When the vehicle enters upon the controlling-section $c^2\ d^2$, the same operation as before is repeated, and a local current is transmitted, which may be traced as follows: From the insulated rail $c^2$ by the wire 18 to the point 19, where it divides, one portion going through the wire 20 to the electro-magnet $M^3$, and thence by wire 21 to the electro-magnet $M^4$, thence by wire 22 to the point 23, returning by wire 24 to the insulated rail $d^2$. The other portion of the same current, diverging from the point 19, goes by the wire 25 back to electro-magnet M', and thence by wire 26 to electro-magnet $M^2$, and thence by wire 27 to the point 23, returning by the wire 24 to the insulated rail $d^2$. The portion of the current which passes by the route first described actuates the electro-magnets $M^3$ and $M^4$, and thus admits the electric current to the next track-section ($a^2$ $b^2$) in advance. The last-named portion of the current (which acts upon the electro-magnets M' and M²) performs no useful function when the vehicle is running in its present direction, and in case a double-track line is employed on which the vehicles run in one direction only, it is entirely dispensed with. It is necessary, however, in the case of a single-track railroad, such as that shown in the figure, on which vehicles may travel in either direction, in order to properly operate the circuit-controllers in advance of a vehicle going in a direction opposite to that of the one now under consideration.

It remains to describe the means for stopping a vehicle traveling upon the railroad-line by a device actuated either from a fixed point as a station, or in case of accident or emergency, from any point along the line.

R' R² are electro-magnets the armatures of which, $r'$ $r^2$, are normally held in contact with the stops $t'$ and $t^2$. These armatures and contact-stops form portions of the branch circuits leading from the main conductors F G to the respective insulated rail-sections $a^2$ $b^2$. The electro-magnets R' R² are kept constantly magnetized by an electric current proceeding from a battery or other suitable generator, o, and circulating constantly through a conductor, 28 29 30 31. This conductor is preferably composed of a thin wire extended along the line of the railroad from one end of the section to the other and back, and may with advantage be placed upon posts or supports near the track at such a height as to be easily reached by a person standing upon the ground. If there is a regular station at any point on the section, a circuit-breaking switch, Q, may be provided for interrupting the circuit.

The operation of this portion of the apparatus is as follows: Suppose a vehicle to be traversing the working-section $a^2$ $b^2$ and it is desired by the station-master or by a watchman to stop the vehicle, this may be effected by severing or interrupting the break-down circuit at any point, which may be done by simply cutting the wire with a suitable instrument, or by opening the circuit-breaker or switch Q. In either case the armature of the electro-magnets R' R² will be simultaneously released, the respective armatures $r'$ $r^2$ will fall back on their rear contacts, $s'$ $s^2$, the result of which will be to instantly disconnect the insulated rail-sections $a^2$ $b^2$ from the main or supply conductors F and G, and to connect them together at each end of the section—viz., at the left end by the conductor 10, armature-lever $r^2$, and conductor 32, and at the right end by the conductor 9, armature-lever $r'$, and conductor 33. The motor of the vehicle being now short-circuited upon itself by the connecting together of the insulated rails upon which it stands, opposes a powerful resistance to the forward movement of the vehicle and brings it quickly to a state of rest. This device forms an efficient safeguard against accident, as any person whatever, upon discovering a dangerous obstruction, can instantly stop all vehicles upon that section by cutting or breaking the controlling or break-down wire at any point of the section.

If sectional conductors independent of the rails of the track are employed, the arrangement of circuits and circuit-controllers remains the same as hereinbefore described, the connections between the traveling motor and sectional conductor being effected by means of brushes, scrapers, or similar well-known devices.

I claim as my invention—

1. In an electrically-actuated railway system, the combination of a main conductor extending along the line of the railway and parallel thereto for supplying an electric current to a vehicle standing or moving upon said railway, circuit-controllers placed at intervals along the line of said railway for establishing and interrupting the passage of the electric current from said conductor through said vehicles, electro-magnets for actuating said circuit-controllers, electric-generators carried upon said vehicles, and electrical conductors whereby said generators are placed in connection with said electro-magnets at required points as said vehicles pass along the line for actuating said circuit-controllers, as set forth.

2. In an electrically-actuated railway system, the combination of a series of insulated track-sections, each of which receives in turn an electric current from a stationary generator, and imparts said current to a reversible traveling electric motor, with a second series of insulated track-sections alternating with the first-named series, each of which receives in turn an electric current from said traveling motor when acting in reverse, and imparts said current to one or more stationary translating devices.

3. In an electrically-actuated railway system, the combination of a series of insulated conductor-sections, each of which in turn receives an electric current from a stationary generator and imparts said current to a reversible traveling motor, with a second series of insulated conductor-sections alternating with the first-named series, each of which receives in turn an electric current from said traveling motor when acting in reverse, and imparts said current to one or more stationary translating devices.

4. In an electrically-actuated railway system, a reversible dynamo-electric machine mounted upon a traveling vehicle having its moving parts mechanically connected with the wheels of said vehicle, in combination with a series of sectional electric conductors extending parallel to the direction of movement of said vehicle, conducting electrical connections between said dynamo-electric machine and that portion of the sectional conductor which is contiguous thereto, conductors connecting each alternate section of said sectional conductor with a source of electrical energy, and conductors connecting the remaining alternate sections with translating devices, as set forth.

5. In an electrically-actuated railway system, the combination of a series of insulated track-sections, each of which in turn receives an electric current from a stationary generator, a second series of insulated track-sections, each having a length approximately the same as that of the extreme wheel-base of the vehicle designed to traverse said track-sections, and alternating with the first-named series, stationary translating devices electrically connected with the last-named series of track-sections, a vehicle having two or more pairs of wheels, and a separate reversible dynamo-electric machine for propelling each pair of wheels, whereby one of said machines may act as a generator at the same time that the other is acting as a motor, as set forth.

6. In an electrically-actuated railway system, the combination of a series of insulated conductor-sections, each of which in turn receives an electric current from a stationary generator, a second series of shorter insulated conductor-sections alternating with the first-named sections, stationary translating devices electrically connected with the last-named series of insulated conductor-sections, a vehicle propelled by two or more independent reversible dynamo-electric machines, and electrical contact devices for connecting said machines independently with the contiguous insulated conductor-section, whereby one of said machines may act as a generator at the same time that another is acting as a motor, as set forth.

7. In an electrically-actuated railway system, the combination of a main conductor extending along the line of a railway and parallel thereto for supplying an electric current to a vehicle standing upon or moving along said railway, an independent electric conductor likewise extending along the line of said railway and parallel thereto, and two independent circuit-controllers, both of which are brought into action upon the severing of said independent conductor to simultaneously interrupt the connection between the supply-conductor and the vehicle on both sides of the latter, as set forth.

8. In an electrically-actuated railway system, the combination of a main conductor extending along the line of the railway and parallel thereto for supplying an electric current to a vehicle standing or moving upon said railway, a stationary circuit-controller placed upon or near the line of said railway for establishing and interrupting the flow of the electric current through said vehicle, an electro-magnet for actuating said circuit-controller, and two distinct electric circuits for actuating said electro-magnet, one of which derives its current from a generator carried upon the vehicle and the other from the main conductor through the circuit which is closed by the circuit-controller itself.

9. In an electrically-actuated railway system, the combination of a main conductor extending along the line of a railway and parallel thereto for supplying an electric current to a vehicle standing upon or moving along said railway, an independent electric conductor likewise extending along the line of said railway and parallel thereto, and a circuit-controller which is brought into action upon the severing of said independent conductor to interrupt or prevent the flow of current from the main or supply conductor to the said vehicle, as set forth.

10. In an electrically-actuated railway system, the combination of a main conductor extending along the line of a railway and parallel thereto, and connected with a suitable source of electric energy for supplying an electric current to a vehicle standing upon or moving along said railway, an independent conductor, also extending along the line of said railway and parallel thereto, and circuit-controllers which are brought into action upon the interruption of said independent conductor to substitute a closed circuit of small resistance in lieu of the circuit extending from said vehicle to and including said source of electric energy.

11. In an electrically-actuated railway system, the combination of a series of insulated conductor-sections, each of which in turn receives an electric current from a stationary generator, and a second series of insulated conductor-sections alternating with the first-named series, each of which receives in turn an electric current from said traveling motor when acting in reverse, one or more stationary circuit-controllers for establishing and interrupting the flow of the electric current from the main or supply conductor to each of the first-named insulated conducting-sections, one or more electro-magnets for actuating said circuit-controllers, and local circuits which convey the current from each one of the second series of insulated conductor-sections to the electro-magnets actuating the circuit-controllers of the adjacent sections in each direction.

12. In an electrically-actuated railway system, the combination of a source of electricity, a series of insulated conducting-sections, a continuous conductor extending from said source into proximity to each of said insulated conducting-sections, electrically-operated circuit-controlling devices for establishing an electric connection between said continuous conductor and said insulating conducting-sections, a reversible electro-dynamic motor actuated by currents supplied thereto through the last-named conductors, and independent electric conductors respectively traversing the actuating electro-magnets of one or more of said electrically-operated circuit-controllers, whereby the latter are actuated by currents produced by said motor when acting in reverse.

13. In an electrically-actuated railway system, the combination of a circuit-controller for establishing and interrupting the flow of the actuating electric current between the source of electric energy and the traveling electric motor, and an electro-magnet for actuating said circuit controller, provided with three independent helices for operating the same upon the passage of a vehicle in each direction and for retaining the same in action while said vehicle is passing over a determinate distance, as set forth.

In testimony whereof I have hereunto subscribed my name this 12th day of February, A. D. 1885.

FRANK L. POPE.

Witnesses:
DANL. W. EDGECOMB,
CHARLES A. TERRY.